United States Patent [19]

Penketh

[11] Patent Number: 5,606,137
[45] Date of Patent: Feb. 25, 1997

[54] OPTICAL TORQUE SENSOR

[75] Inventor: David M. Penketh, Staffordshire, England

[73] Assignee: Lucas Industries Public Limited Company, West Midlands, England

[21] Appl. No.: 522,315

[22] PCT Filed: Jan. 11, 1995

[86] PCT No.: PCT/GB95/00050

§ 371 Date: Sep. 12, 1995

§ 102(e) Date: Sep. 12, 1995

[87] PCT Pub. No.: WO95/19557

PCT Pub. Date: Jul. 20, 1995

[30] Foreign Application Priority Data

Jan. 12, 1994 [GB] United Kingdom .................... 9400511

[51] Int. Cl.$^6$ .................................................. G01N 3/00
[52] U.S. Cl. .................. 73/862.324; 73/862.321
[58] Field of Search .................. 73/862.321, 862.324, 73/862.327, 862.328, 862.329; 356/32

[56] References Cited

U.S. PATENT DOCUMENTS

| 4,420,251 | 12/1983 | James et al. | 356/32 |
| 4,507,834 | 4/1985 | Chen et al. | 73/862.324 |
| 4,668,087 | 5/1987 | Strandell et al. | 356/32 |
| 4,788,898 | 12/1988 | Wilk | 356/32 |
| 4,996,884 | 3/1991 | Lessing | 356/32 |
| 5,369,583 | 11/1994 | Hazelden | 73/862.324 |

FOREIGN PATENT DOCUMENTS 58-055730  6/1983  Japan .

Primary Examiner—Richard Chilcot
Assistant Examiner—Ronald L. Biegel

[57] ABSTRACT

An optical torque sensor for incorporation in a vehicle steering system comprises a light-emitting diode (LED) 1, a light sensor 2 which receives a light signal, a signal processor for receiving output signals from the light sensor 2, and a light-transmitting medium which alters the direction of propagation of light propagating through the medium to an extent which is dependent on the torque applied to the medium. The medium is defined by a generally cylindrical body 5 which is attached to input and output ends 7 and 8 of a torsion bar 10. In one construction, the body is formed of a plurality of optical fibres 6 or a plastics material having polarised strata along the length of the cylinder. In an alternative construction, the medium is a material having a refractive index which is dependent on the torque applied to the medium. The signal processing means processes the output signals from the light sensor 2 so as to produce an output signal indicative of the torque applied between the input and output members of the torsion bar.

22 Claims, 9 Drawing Sheets

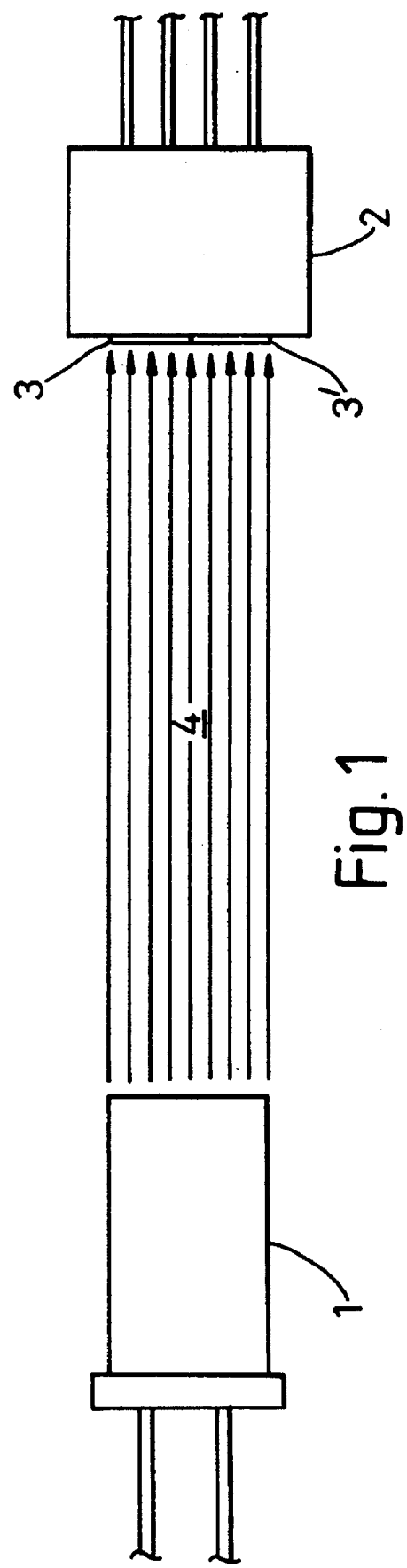
Fig. 1
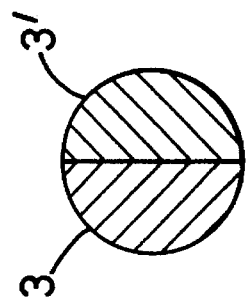
Fig. 4
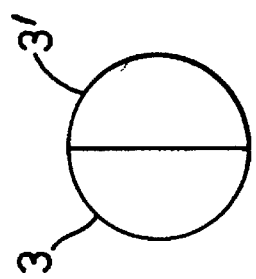
Fig. 3
Fig. 2

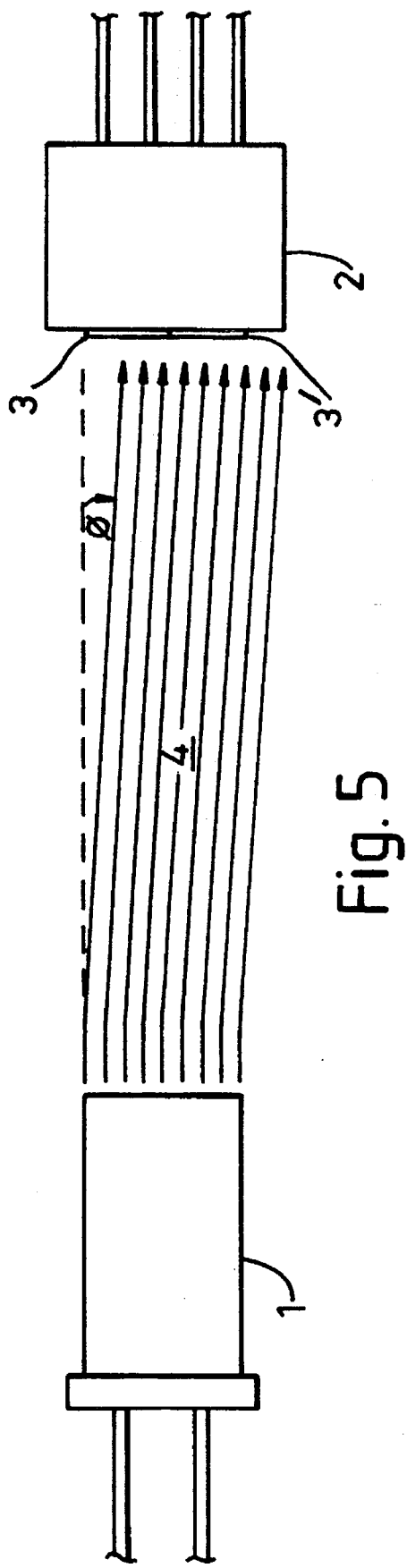
Fig. 5
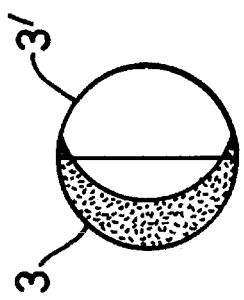
Fig. 7
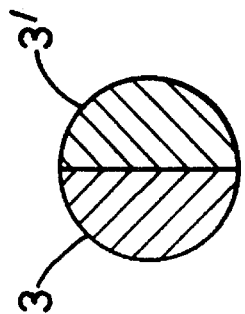
Fig. 8
Fig. 6

OPTICAL TORQUE SENSOR

RELATED APPLICATIONS

This application is a continuing application based on prior copending application PCT/GB95/00050, filed Jan. 11, 1995, the benefit of the priority of which under 35 U.S.C. §120 is hereby claimed.

This invention relates to optical torque sensors especially, but not exclusively, for incorporation in vehicles.

Our European Application No. 93300792.4 describes an optical torque sensor which incorporates an input and an output member, each member being associated with a disc-shaped mask of equi-angularly spaced apertures which moves angularly with the respective member. However, this type of torque sensor requires a high degree of optical alignment. When such an optical torque sensor is designed to compensate for misalignment of the two masks, two sets of signal detectors may have to be positioned at exactly 180° opposite each other. Such optical alignment accuracy presents many difficulties to manufacturers of the sensors.

According to a first aspect of the present invention a torque sensor comprises emitter means, receiver means adapted to receive a signal, signal processing means adapted to receive an output signal from the receiver means, the output signal from the receiver means being dependant upon the signal which it receives, and further comprising an electromagnetic radiation transmitting medium which alters the direction of propagation of electromagnetic radiation propagating through the medium and which is defined by a generally cylindrical body, the body being adapted to be attached to both an input member and an output member of a torsion bar which is located on a central axis of the body, the extent to which the direction of propagation is altered being dependant upon the torque applied to the medium, and the signal processing means being adapted to process the output signal from the receiver means so as to produce a modified output signal indicative of the torque applied between the input and output members.

We therefore provide a torque sensor utilising electromagnetic radiation effects which is simple to manufacture and in which alignment difficulties are reduced or substantially eliminated.

Preferably, the body comprises a cylinder, and the emitter means and the receiver means are aligned opposite each other on a line parallel with the central axis of the cylinder such that a portion of the cylinder wall is positioned between the emitter means and the receiver means. The emitter means is preferably adapted to emit a signal beam of electromagnetic radiation and the receiver means is preferably adapted to receive this signal beam radiation.

The emitter means and the receiver means may be mounted in a housing. The housing preferably prevents any electromagnetic radiation other than signal beam radiation from reaching the receiver means.

The cylinder is preferably firmly secured to both the input and the output member, the two members being aligned on the central axis of the cylinder such that the input member lies perpendicularly to one end face of the cylinder and the output member lies perpendicularly to the other end face.

Preferably the cylinder medium acts as an electromagnetic waveguide which guides the emitted signal beam of radiation along a path between the emitter means and the receiver means. Preferably, when no torque is applied between the input and output members, the cylinder medium guides the emitted signal beam along a longitudinally straight path between the emitter means and the receiver means, parallel to the central axis of the cylinder. When torque is applied between the input and output members the cylinder medium is preferably subjected to the same torque which in turn twists the medium of the cylinder to alter the path along which the signal beam radiation is guided such that the direction of propagation of the signal beam radiation leaving the cylinder medium via the end face of the cylinder which is nearest to the receiver means is not the same as the direction of propagation of the signal beam radiation which entered the cylinder medium via the end face of the cylinder nearest the emitter means. The applied torque effectively causes the cylinder to deflect the signal beam away from its longitudinally straight "no torque" path.

Preferably, with no torque applied to the cylinder, the undeflected signal beam radiation which is transmitted by the cylinder falls on a sensing area of the receiver means and the cross-sectional area of the beam, in the plane of the receiver sensing area, is preferably greater than or equal to the sensing area of the receiver means and preferably totally overlaps the sensing area of the receiver means. When maximum torque is applied between the input and output member, in either a clockwise or anti-clockwise direction, the signal beam radiation is preferably deflected inside the cylinder medium to an extent such that the transmitted signal beam which arrives in the plane of the sensing area of the receiver means has virtually, but not entirely, no overlap with the sensing area.

The cylinder medium may comprise a plurality of optical fibres which are secured together to form a cylinder. Normally many thousands of fibres will constitute the medium. Preferably the medium comprises a solid piece of cylindrical plastics material having polarised strata running longitudinally down its length or, alternatively, any plastics material having a molecula structure which exhibits the desired electromagnetic wave-guiding properties.

Alternatively, rather than acting as an electromagnetic waveguide, the cylinder medium merely acts as an obstacle in the path of the emitted signal beam of radiation which alters the direction of propagation of the signal beam radiation between the emitter means and the receiver means, in response to torque applied to the cylinder, by means of refraction of the signal beam radiation. This may be achieved if the cylinder comprises a medium having a refractive index which is dependant upon the torque applied to the medium. Preferably, with no torque applied between the input and output members, and hence no torque applied to the cylinder medium, the signal beam radiation propagates along a longitudinally straight path from the emitter means, through the cylinder medium, to the receiver means. The cross-sectional area of the signal beam in the plane of the sensing area of the receiver means is again preferably greater than or equal to the sensing area of the receiver means and preferably totally overlaps the sensing area of the receiver means when no torque is applied. When torque is applied between the input and output members, and hence to the cylinder, the refractive index of the cylinder medium may be either increased or decreased by this application of torque. This increase or decrease in the refractive index causes the signal beam radiation propagating through the cylinder to be refracted away from its longitudinally straight path through the cylinder medium. Preferably, with maximum torque applied between the input and output members, the change in refractive index of the cylinder medium is sufficient to refract the signal beam radiation transmitted by the cylinder to an extent such that the cross-sectional area of the transmitted beam which arrives in the plane of the sensing area of the receiver means has virtually, but not entirely, no overlap with the sensing area.

The receiver means may comprise a split faced sensor having two sensing faces of equal area. Each sensing face is preferably adapted to produce an output signal which is dependant upon the intensity of electromagnetic radiation incident on that sensing face. The sensor may be adapted to detect many frequencies of electromagnetic radiation but is preferably optimised to detect the electromagnetic radiation of the signal beam.

The signal processing means is preferably adapted to process the output signals from the two sensing faces of the receiver means so as to produce a modified output signal which is inversely proportional to the torque applied to the cylinder medium and, therefore, the torque applied between the input and output members.

Alternatively, the receiver means may comprise an electromagnetic radiation sensor having hundreds of electromagnetic radiation detecting elements arranged in a grid matrix. Each of these detecting elements is preferably adapted to sense not only the presence or absence of electromagnetic radiation, but also the intensity of the electromagnetic radiation incident on that detecting element. Each detecting element is preferably optimised to detect the signal beam radiation. Preferably, the surface area of the grid matrix is large enough to accommodate the entire cross-section of the signal beam falling in the plane of the surface area of the grid matrix, not only when there is no torque applied between the input, and output member but also when maximum torque is applied in either direction.

The signal processing means preferably further comprises electronics which are adapted to store and retain data even under "power-off" conditions. The electronics may be programmed to "remember" which of the detecting elements of the grid matrix detect any signal beam radiation when no torque is applied between the input and output members, and when maximum torque is applied in either direction, and also the intensity of the signal beam radiation detected by each detecting element under the "no torque" condition and the two "maximum torque" extremes. Preferably the signal processing means is adapted to process this stored data to determine applied torque ratios between the two torque extremes.

Advantages of the latterly described grid matrix type of receiver means include the capability of such receiver means to self-compensate for errors introduced into:- the signal beam intensity falling on the sensing area of the receiver means; the position at which light falls onto the sensing area, and the magnitude of the change in propagation direction encountered with applied torque, all of which may occur due to dimensional variations in the emitter and/or receiver means position(s) relative to the cylinder. This type of receiver means is capable of self-compensation for amplification effects which may appear in the generated torque signal as a result of such errors.

According to a second aspect the invention comprises a steering system for a vehicle in which the system includes a steering column incorporating a torque sensor according to the first aspect of the invention. The steering column of the vehicle preferably comprises the torsion bar.

Embodiments of the invention will now be described by way of example only with reference to the accompanying drawings of which:

FIG. 1 is a top view showing schematically the principle behind a torque sensor for incorporation in a vehicle in a condition where emitted light rays propagate along a straight line path between a light emitting diode (LED) and a split-faced light sensor;

FIGS. 2, 3 and 4 are schematic representations of, respectively, the LED face, a light signal falling on the split-faced sensor face and the split-faced sensor face itself, where the emitted light rays propagate along the straight line path between the LED and the split-faced light sensor;

FIG. 5 is a top view showing schematically the condition where emitted light rays propagating between the LED and the split-faced light sensor are deflected in one direction;

FIGS. 6, 7 and 8 are schematic representations of, respectively, the LED face, a light signal falling on the split-faced sensor face and the split-faced sensor face itself, where the emitted light rays are deflected in one direction;

Figure 9:
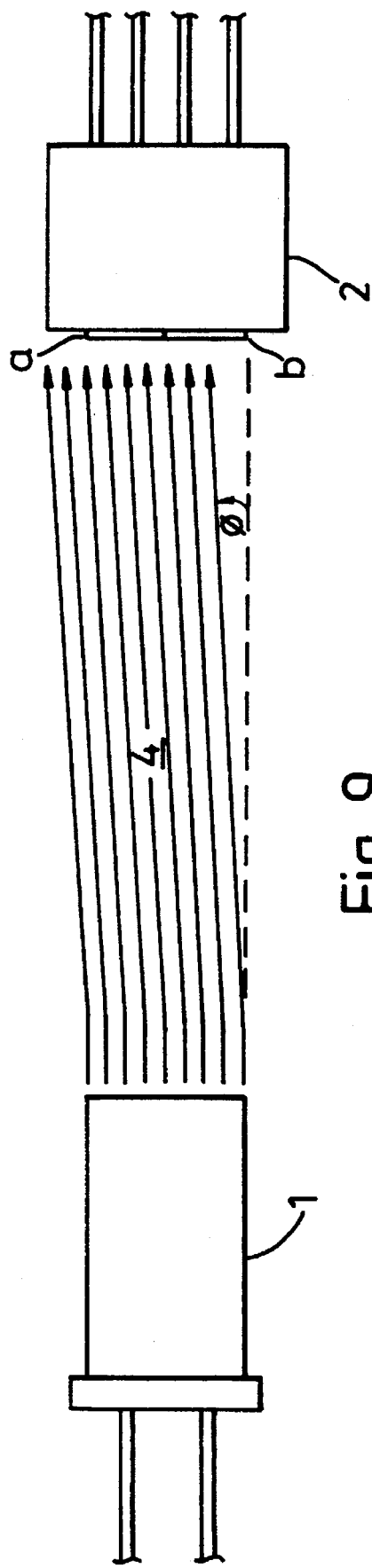
FIG. 9 is a top view showing schematically the principle behind the torque sensor where the emitted light rays are deflected in the other direction.
Figure 12:
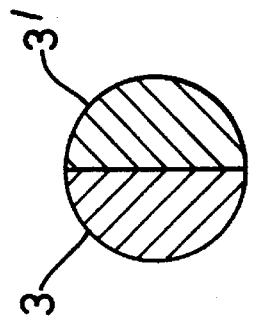
FIGS. 10, 11 and 12 are schematic representations of, respectively, the LED face, a light signal falling on the split-faced sensor face and the split-faced sensor face itself, where the emitted light rays are deflected in the other direction.
Figure 11:
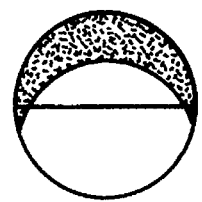
Figure 10:
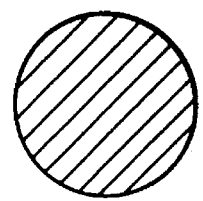

The principle of operation of an optical torque sensor for incorporation in a vehicle is shown schematically in FIGS. 1 to 12. The sensor utilises deflection of light in response to applied torque in order to enable the measurement of torque applied to the torsion bar of a steering column i.e. the amount of angular distortion between an input and an output end of the torsion bar. FIG. 1 shows a light emitting diode (LED) 1 which emits a signal beam of light rays 4 from the LED face shown schematically in FIG. 2, which are received by a split-faced light sensor 2, on the faces 3, 3' of the sensor shown schematically in FIG. 4, which is optically aligned with the LED. The light sensor is sensitive to all light frequencies but it optimised to detect the signal beam light.

Both halves 3, 3' of the split-faced light sensor receive equal maximum light intensity from the LED, as shown schematically in FIG. 3. The analog outputs from each half face 3, 3' of the light sensor 2 are input to a microprocessor (not shown) which adds these outputs and divides the total by two to give an average overall intensity. In the arrangement shown in FIG. 1 this calculation would be of the form:

Output from sensor face 3 = 100%
Output from sensor face 3' = 100%

$$\text{Average overall output} = \frac{100\% + 100\%}{2} = 100\%$$

If the average overall output signal is inversely related to the torque applied between the input and output ends of the torsion bar, then this 100% output is indicative of zero applied torque.

FIG. 5 shows schematically the condition where the emitted light rays 4 are deflected by an angle ∅ from their straight line optical path shown in FIG. 1. The light signal falling on the faces 3, 3' of the split-faced light sensor 2 in this condition is shown schematically in FIG. 7. The amount of light-falling on each face 3, 3' is no longer equal. In this arrangement, the average overall intensity calculation is of the following form, for example:

Output from sensor face 3 = 20%
Output from sensor face 3' = 80%

$$\text{Average overall output} = \frac{20\% + 80\%}{2} = 50\%$$

$$\text{Torque} \propto \frac{1}{\text{average overall output}}$$

Therefore Torque = 50% of maximum allowable torque.

As sensor face 3' has a greater output than sensor face 3, corresponding to a greater incident signal beam light intensity on face 3' than on face 3, it is possible to determine that the light rays have been deflected towards sensor face 3'. Similarly, FIG. 9 illustrates the situation where the light rays are deflected by an angle ∅ from the straight line path shown in FIG. 1, and towards the sensor face 3. The average overall intensity calculation is of the form:

Output from sensor face 3 = 80%
Output from sensor face 3' = 20%

$$\text{Average overall output} = \frac{80\% + 20\%}{2} = 50\%$$

Therefore, Torque = 50% of maximum allowable torque.

However, as sensor face 3 has a greater output than sensor face 3', it is possible to determine that the light rays have been deflected towards sensor face 3 in this situation.

Figure 13:
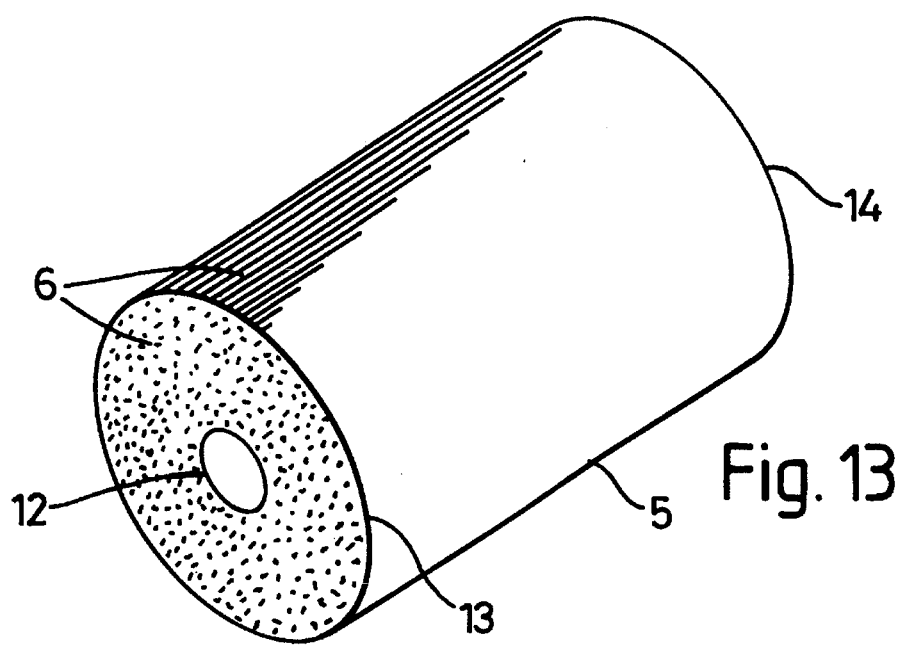
FIG. 13 is a perspective schematic view of a cylindrical waveguide comprising thousands of optical fibres which are secured together.
Figure 17:
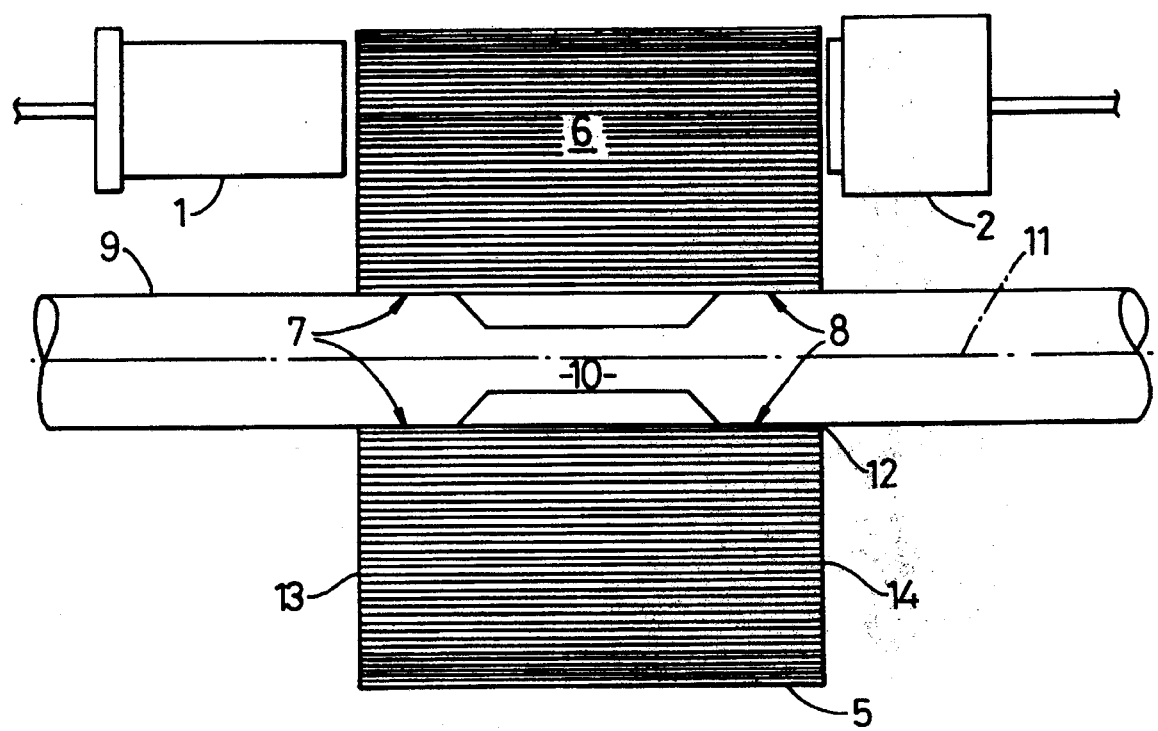
FIG. 17 is a cross-sectional side view of the torque sensor incorporating the cylindrical waveguide which is attached to either end of a torsion bar.

This is the basic operating principle of a torque sensor according to the invention. The deflection of light rays between the LED and the light sensor 2 of the torque sensor in response to torque applied between the input and output ends of the torsion bar is achieved by the incorporation of an optically active medium in the torque sensor. The medium is of cylindrical shape and is illustrated schematically in FIG. 13. In this embodiment, the cylinder 5 defining the medium comprises thousands of optical fibres 6 which are secured together to form the cylinder. The fibres 6 are arranged such that with no torque applied to the cylinder the fibres are all aligned substantially parallel to each other and to a central rotational axis 11 of the cylinder. The cylinder is secured to a steering column 9 at both an input end 7 and an output end 8 of a torsion bar 10 of the steering column, as shown in FIG. 17, so that the steering column 9 and torsion bar 10 have the same longitudinal axis as the central rotational axis 11 of the cylinder. The cylinder 5 has a central bore 12, the diameter of the bore being only large enough to enable the steering column 9 to fit snugly into the bore 12 as shown in FIG. 17.

Figure 18:
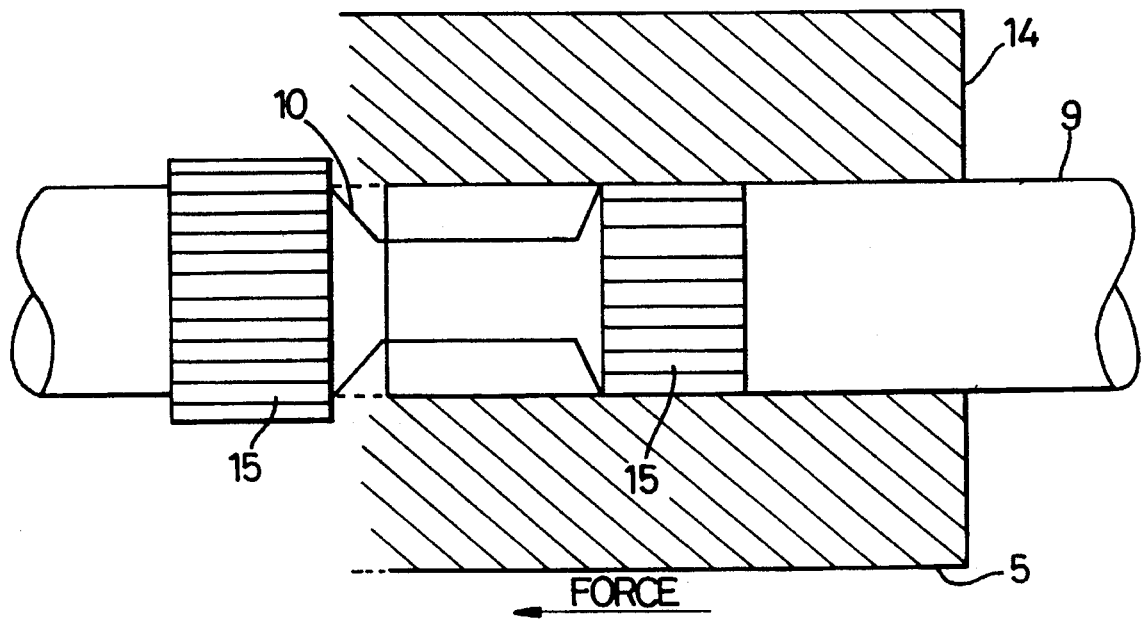
FIG. 18 is a cross-sectional view of the cylindrical waveguide being fixed to a torsion bar.

The cylinder 5 is fitted to the steering column 9 while the torsion bar is in a relaxed ("no twist") state, with the cylinder medium also in a relaxed ("no twist") state. As shown in FIG. 18, the input and output ends 7, 8 of the torsion bar each have a collar of raised splines 15 parallel to the axis of the torsion bar 10, and extending round the full circumference of the input and output ends of the bar 10 respectively. The splines enable the cylinder 5 to be force fitted to the torsion bar 10 by cutting into the material of the cylinder as the cylinder is pushed over the splines until the torsion bar is fully inserted in the bore of the cylinder. This secure fit of the cylinder to the input and output ends of the torsion bar ensures that any torque applied between the input end 7 and the output end 8 will consequently also be applied to the cylinder medium.

The LED 1 is positioned such that it is optically aligned with the light sensor 2 and such that the light beam emitted by the LED enters the cylinder medium through end face 13 of the cylinder 5, which lies perpendicularly to the central axis 11 of the cylinder. The signal light beam propagates through the cylinder 5 and leaves the cylinder medium through end face 14 of the cylinder, which lies parallel to end face 13 and close to the light sensor 2. The radial thickness of the cylinder wall is sufficient to allow at least the full cross-section of the signal light beam to be accommodated within the cylinder as the beam propagates through the cylinder.

Figure 14:
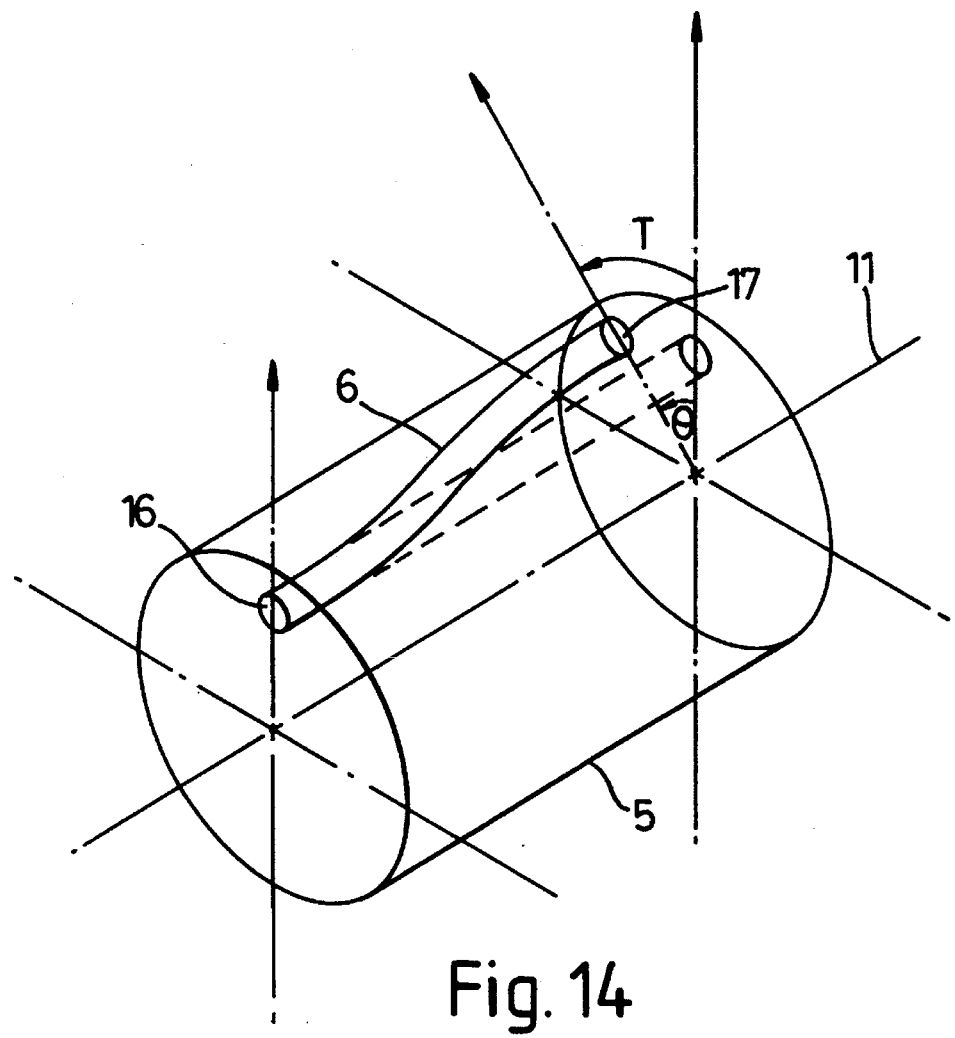
FIG. 14 is a perspective schematic view of the cylindrical waveguide, twisted under applied torque.
Figure 15:
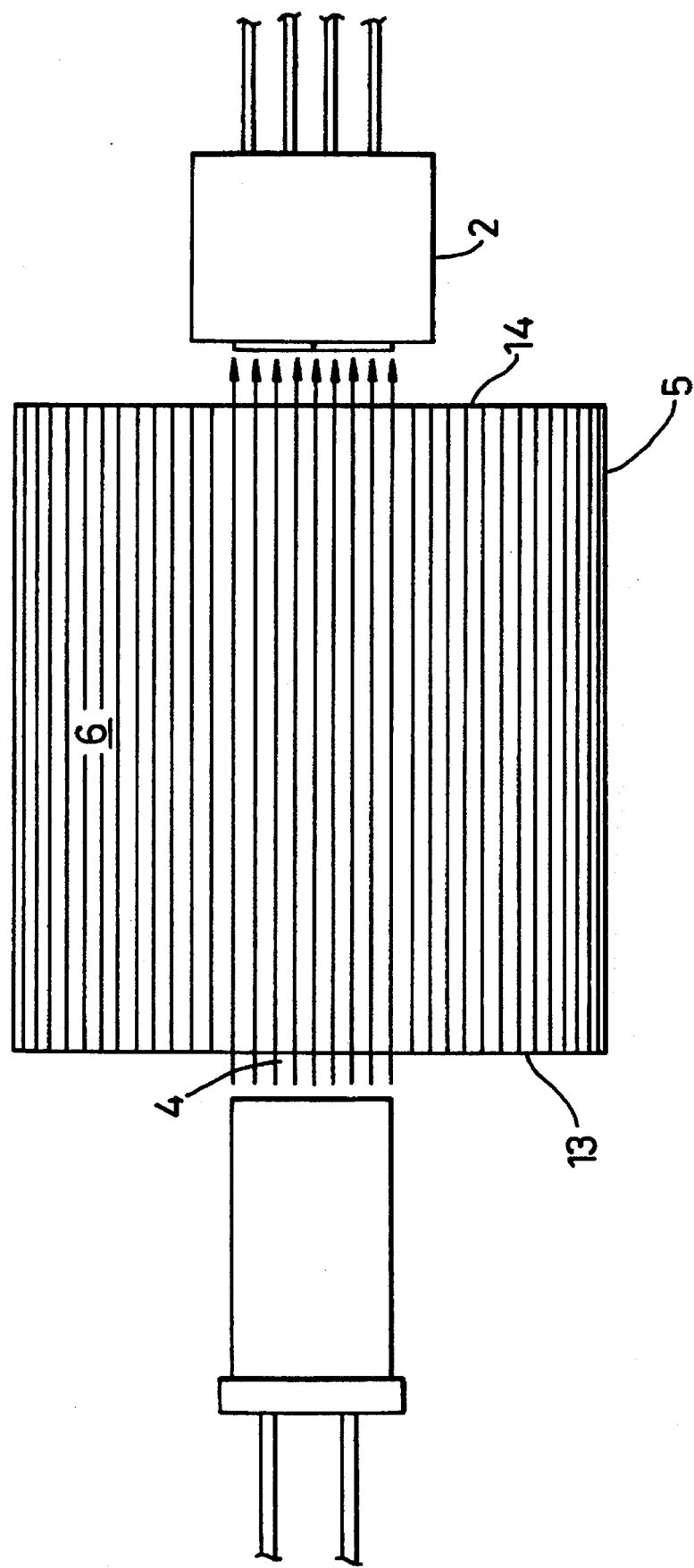
FIG. 15 is a top view showing schematically the optical path taken by the emitted light rays, through the cylindrical waveguide incorporated in the torque sensor, in the condition where no torque is applied to the cylindrical waveguide.
Figure 16:
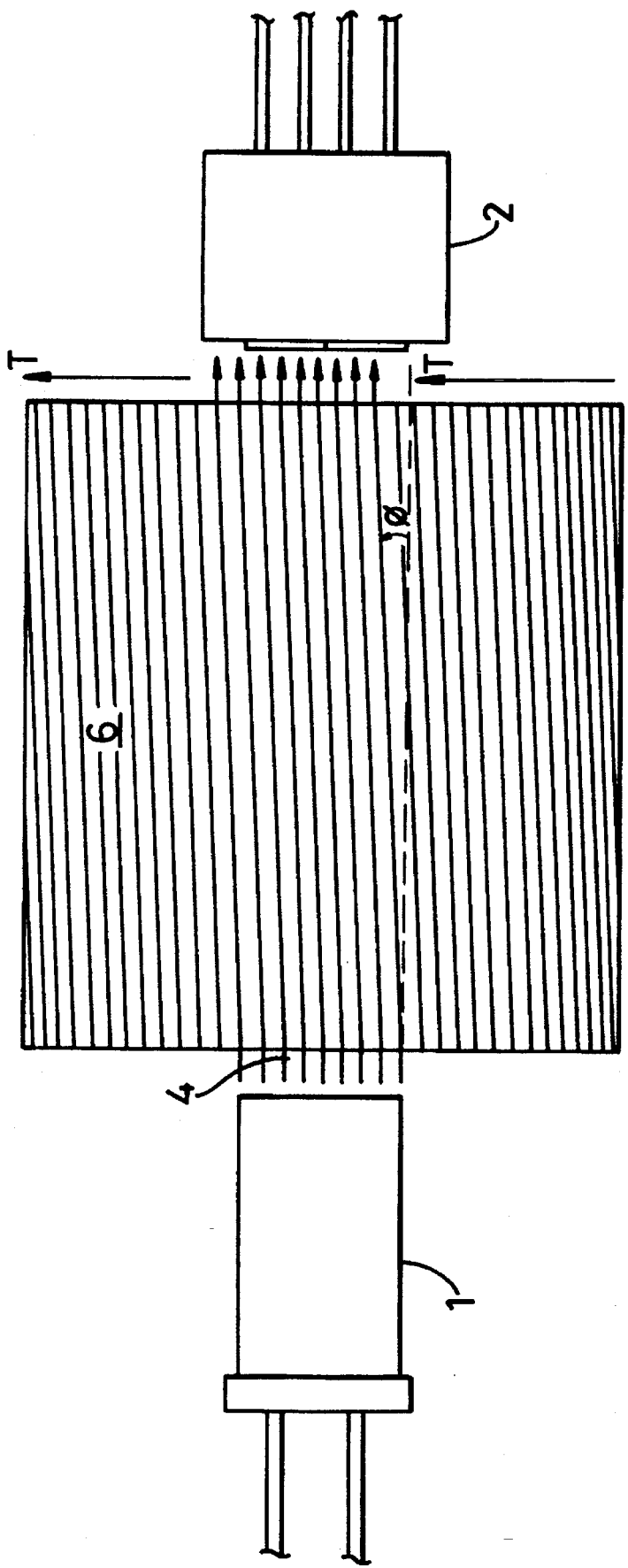
FIG. 16 is a top view showing schematically the optical path, taken by the emitted light rays, through the cylindrical waveguide incorporated in the torque sensor, in the condition where torque is applied to the cylindrical waveguide in one direction.

As shown schematically in FIG. 15, with no torque applied between the input end 7 and the output end 8 of the torsion bar 10, the signal light beam emitted by the LED is guided, by the optical fibres 6, from end face 13 to end face 14 of the cylinder 5, with no change in the direction of propagation of the light rays. Thus, the optical fibre-containing cylinder medium effectively acts as a light waveguide. The signal beam transmitted by the cylinder falls on the split-faced light sensor 2, as illustrated in FIG. 3, with equal intensity on each half sensor face 3, 3'. FIG. 14 shows schematically the effect on the cylinder medium when a torque T is applied to the cylinder as a result of torque being applied to the torsion bar. Each of the optical fibres 6 is twisted by-the torque T applied to the cylinder to the extent that end faces 16, 17 of the fibre, contained in the respective end faces 13, 14 of the cylinder wall, are no longer aligned on a straight line parallel to the axis 11 of the cylinder, but are angularly misaligned by an angle P, dependant upon the applied torque, T. This situation is illustrated in FIG. 14 for one of the optical fibres contained in the cylinder medium. The light signal beam emitted from the LED 1 and entering the cylinder 5 through end face 13 enters the fibre end face 16 and is guided to the angularly displaced far end face 17 of the fibre by reflection of the signal beam light rays inside the fibre. Light rays reaching the angularly displaced far end of each fibre, which leave the cylinder medium through end face 14 of the cylinder, are propagating in a different direction to the light rays which entered that fibre via end face 13 of the cylinder 5. The overall effect is that the propagation direction of the signal light beam transmitted by the cylinder is displaced at an angle ∅ from the straight line propagation direction of the beam when no torque is applied to the cylinder, as illustrated schematically in FIG. 16. The light signal falling on the split-faced sensor 2 in this situation is of the form shown in FIG. 11. If the torque T is applied in the opposite direction (about the axis 11) the angular deflection of the signal light beam will be the same angle ∅ from the undeflected propagation direction of the beam, but will be in the opposite direction, as illustrated in principle in FIG. 5.

This arrangement incorporating the optical fibre containing cylinder medium thus achieves the desired deflection of the light beam emitted by the LED, in response to torque applied to the torsion bar 10.

The sensing area of the split-faced light sensor 2 is substantially equal to the full cross-sectional area of the signal light beam which arrives in the plane containing the sensing area of the light sensor 2 and this cross-sectional area of the beam in the plane of the sensing area is arranged to be such that when maximum torque is applied to the torsion bar 10 (and hence to the cylinder), in either direction, the signal beam is deflected to the extent that virtually, but not entirely, no overlap exists between the sensing area and the cross-section of the signal beam arriving in the plane of the sensing area. With no torque applied, the cross-sectional area of the beam in the plane of the sensing area of the light sensor 2 preferably entirely overlaps the sensing area of the light sensor 2.

Figure 19:
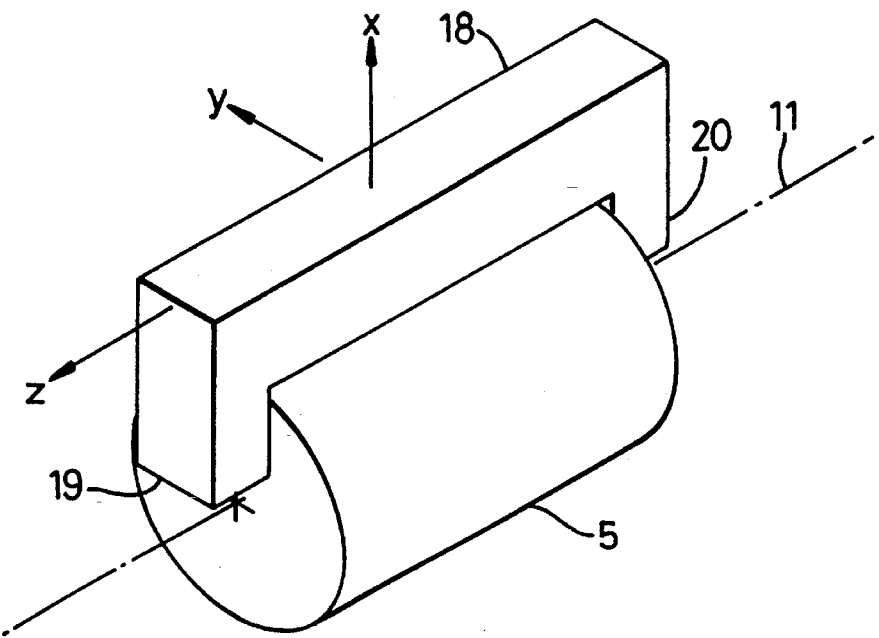
FIG. 19 is a perspective view of a one-piece housing in which the LED and the light sensor are housed and which extends between both ends of the cylindrical waveguide, shown partially surrounding the cylindrical waveguide.
Figure 20:
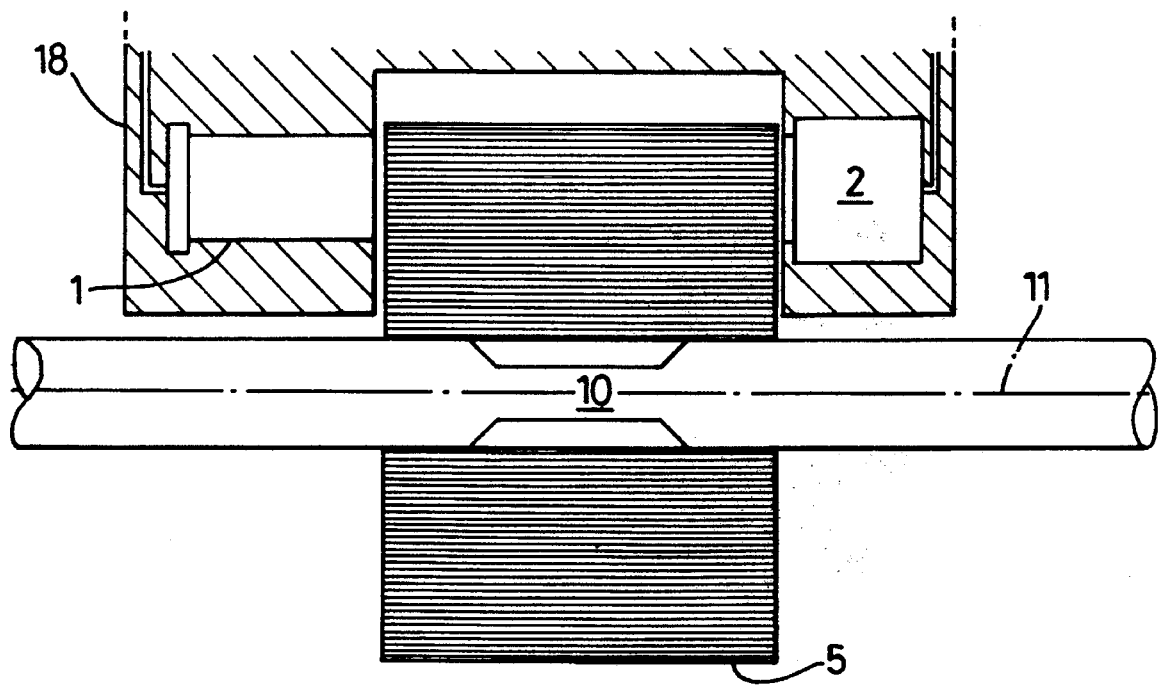
FIG. 20 is a cross-sectional side view of the torque sensor incorporating the cylindrical waveguide in which the LED and the sensor are mounted in the one-piece housing.

In this embodiment of the invention the LED 1 and the light sensor 2 are mounted in a one-piece housing 18, as shown in FIG. 19. The housing 18 is of substantially U-shape and the LED is mounted in one arm portion 19 of the U-shaped housing and the light sensor 2 is mounted in the other arm portion 20, as shown in FIG. 20. The light sensor 2 is shielded from any background light, not originating from the signal beam, by the housing.

In an alternative embodiment of the invention the LED 1 is mounted in arm portion 20 of the U-shaped housing and the light sensor 2 is mounted in arm portion 19. In all other respects this embodiment is identical to the first embodiment of the invention and the operating principles are exactly the same in both embodiments.

In practice the optically active medium is not made up of thousands of optical fibres which are secured together but is instead a solid piece of cylindrical plastics material having polarised strata running longitudinally down its length. Such a material may be manufactured by extruding fibre optic 'strands' which are immediately compression plastic welded together in the desired cylindrical form.

In a further embodiment the optically active medium is a solid piece of plastics material in the shape of a cylinder, the surface of which has been scored longitudinally and then coated with a fine layer of plastic. This fine layer has also been scored and coated with a further fine layer of plastic, and this process repeated till a cylinder having sufficient wall thickness is obtained.

The optical torque sensor of any of these embodiments does eliminate the alignment problems associated with known optical torque sensors which operate using the "two rotating masks" principle, and also reduces the optical alignment accuracy required in all three dimensions relative to the cylinder 5 since there is no requirement for two sets of sensing areas to be positioned exactly 180° opposite each other, which may be required in the "two rotating masks" type of sensor in order to avoid ripple in the torque sensor output signal.

However, in the torque sensor according to the present invention a certain amount of dimensional position tolerancing must be achieved relative to the cylinder 5. Any variation in the positions of either the LED 1 or the light sensor 2 in an X, Y or Z direction, where each of the X, Y, Z axes are perpendicular to the other two axes and the Z axis lies parallel to the central cylinder axis 11 as shown in FIG. 19, will introduce errors in the intensity and/or position of incident light falling on the sensing area of the light sensor 2, which will in turn create errors or amplification effects in the measured torque. For example, if the LED 1 and light sensor 2 move nearer to the circumference of the end faces 13, 14 of the cylinder, away from the torsion bar 10, greater angular deflection of the beam will occur, which in turn results in amplifications of the measured torque since the displacement of the beam cross-section at the light sensor 2 will be proportionately greater than the displacement when the LED and light sensor are closer to the torsion bar axis. Also, error is introduced in the incident light signal falling on the sensor 2 if light from the LED does not fall at 90° relative to the end face 13 of the cylinder 5 in order to ensure maximum light transfer to the light sensor 2. Error is caused by any skew angle introduced between optical emitter and sensor 2 relative to the centre of the cylinder medium.

Figure 21:
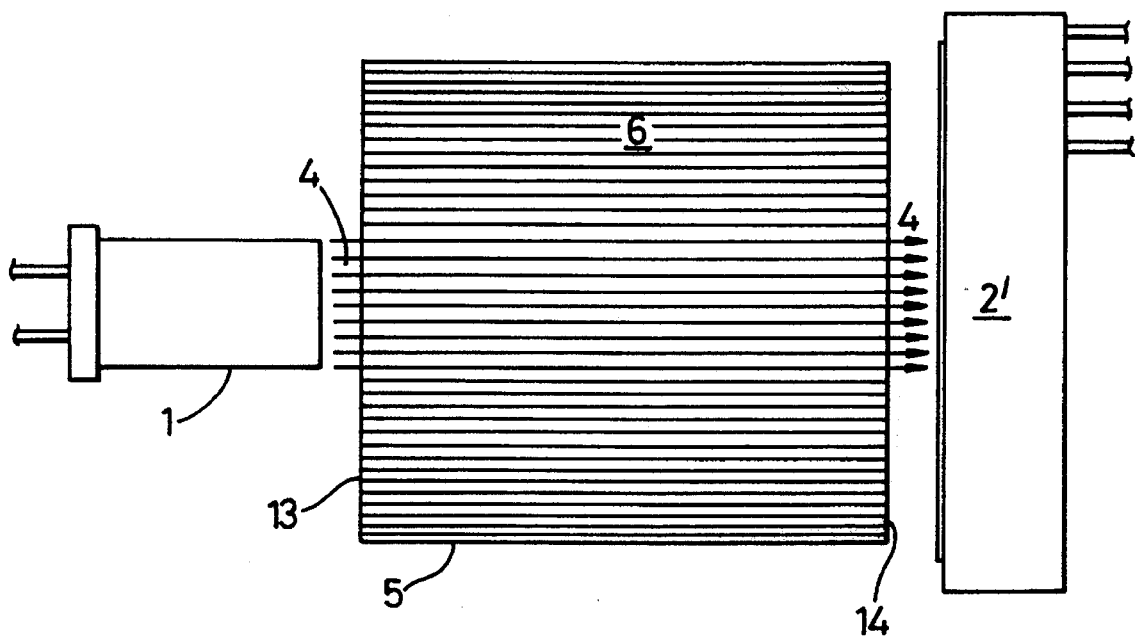
FIG. 21 is a top view of the torque sensor incorporating a grid matrix light sensor.

Such errors due to intensity and positional variation of incident signal light falling on the light sensor 2 are overcome in a further embodiment of the invention in which, instead of comprising a split-faced sensor as illustrated in FIGS. 1–12 and FIGS. 15–16, the light sensor 2 comprises a grid matrix light sensing surface which comprises hundreds of light sensitive elements arranged in a grid matrix. Each element is capable of sensing not only the presence or absence of light but also the intensity of light falling on that area. Each element is optimised to sense incident signal beam light. Such a sensor may be manufactured from a custom gate application specific integrated circuit (ASIC) or, alternatively, a charge coupled detector (CCD) array. FIG. 21 shows schematically an optical torque sensor incorporating a grid matrix light sensor 2'. The sensor 2' is optically aligned with the LED 1, proximate to end face 14 of the cylinder 5, in order to receive signal beam light from the LED, transmitted by the cylinder medium. FIG. 21 illustrates the situation where no torque is applied to the torsion bar 10 and therefore there is no torque applied to the cylinder medium and no deflection of the signal beam light rays 4 as they propagate through the cylinder medium.

Figure 22:
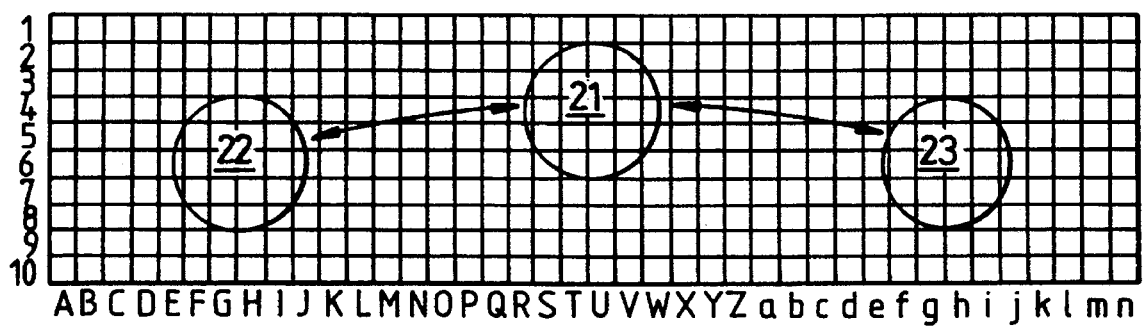
FIG. 22 shows schematically the surface area of the grid matrix sensor and the positions of the cross-sections of the light beam transmitted by the cylindrical waveguide under conditions where no torque is applied to the cylindrical waveguide, or maximum torque is applied in either direction.

The surface area of the grid matrix sensor 2' is large enough to accommodate the cross-sectional area of the transmitted signal light beam in the plane of the surface of the sensor 2' both when the light beam is undeflected and also when the beam is deflected as a result of maximum torque being applied to the torsion bar, in either rotational direction about the axis 11. FIG. 22 shows schematically the surface area of the grid matrix with incident beam cross-sections 21, 22 and 23, corresponding to the signal beam cross-section positions on the grid matrix when zero torque and the two extreme torque maxima, respectively, are applied to the torsion bar 10.

Output signals from the grid matrix sensor 2' are input to support electronics which either comprise a part of the microprocessor of the torque sensor or, alternatively, comprise a support memory of the microprocessor. The support electronics have the ability to store and retain data even under "power-off" conditions. The electronics can thus be programmed to "remember" which of the hundreds of detecting elements are not detecting any signal beam light when no torque is applied between the input and output ends of the torsion bar 10, and also the intensity of light falling on those sensing elements which are detecting signal beam light in the "zero torque" condition. By applying maximum torque in one direction and programming the electronics to "remember" also which detecting elements detect signal beam light and the intensity of light detected by these elements, and programming the electronics to collect the same information when maximum torque is applied in the opposite direction, it is possible to calculate where the signal beam falls on the grid matrix sensor surface under the maximum torque and zero torque conditions. The microprocessor processes this stored information to calculate applied torque ratios between the two maximum torque extremes.

Advantages of this grid matrix type of sensor 2' include its inherent capability for self-compensation for incident light intensity variations, or positional variations in incident light, at the light sensor 2' due to movement in position of the LED 1 and/or the light sensor 2', and also any amplification effects in the generated torque signal which may result from such variations.

In a further alternative embodiment of the invention, instead of utilising light deflecting properties of the chosen cylinder medium in order to create the desired change in propagation direction of the signal light beam in response to torque applied to the cylinder medium, a material having suitable light refracting properties may be chosen as the cylinder medium. By choosing a material having a refraction index which is dependant upon torque applied to the material, it is possible to manufacture a cylinder which produces the desired change in propagation direction of the signal light beam in response to torque applied to the cylinder. For example, a suitable cylinder medium would be one having a refractive index which is such that a signal beam emitted from the LED travels straight through the cylinder medium with no change in propagation direction while no torque is applied to the cylinder 5 (via the torsion bar 10), but in which applied torque produces an increase in the refractive index of the medium which, in turn, causes the signal beam to be refracted away from its straight "no torque" path through the cylinder so that the signal beam cross-section is displaced in the plane of the light sensor 2, as illustrated in principle in FIG. 5. To produce displacement of the beam cross-section in the opposite direction, as illustrated in FIG. 9, the refractive index of this cylinder medium must decrease in response to torque applied in the opposite direction, so that the signal beam light rays are refracted away from their straight "no torque" path in the opposite direction.

A material having the desired refracting properties could be an optically non-linear plastics material.

I claim:

1. A torque sensor comprising emitter means for producing a first signal, receiver means for receiving said first signal and for producing an output signal, said output signal being dependent upon said first signal received by said receiver means, and signal processing means for receiving said output signal from said receiver means, said sensor further comprising an electromagnetic radiation transmitting medium for transmitting said propagated electromagnetic radiation from said emitter means to said receiver means to alter the direction of said propagation through said medium to an extent which is dependent upon the torque applied to said medium, a torsion bar having an input member and an output member, said medium being defined by a generally cylindrical body having a central axis, and means adapted to attach said cylindrical body to both said input member and said output member of said torsion bar, said torsion bar being located on said central axis of said body, and said signal processing means being adapted to process said output signal from said receiver means so as to produce a modified output signal indicative of the torque applied between said input and output members of said torsion bar, wherein said first signal comprises a signal beam of electromagnetic radiation which propagates along an axis parallel to said central axis of said body.

2. A torque sensor according to claim 1, wherein said body comprises a cylinder having two parallel end faces, said end faces defining two opposed exterior surfaces.

3. A torque sensor according to claim 2, wherein said cylinder has a wall, and a portion of said wall is located between said emitter means and said receiver means.

4. A torque sensor according to claim 3, wherein, in use, said portion of said wall of said cylinder is adapted to deflect said emitted signal beam of electromagnetic radiation through an angle directly proportional to the torque applied to said cylinder.

5. A torque sensor according to claim 2, wherein said medium comprises a plurality of optical fibres, and means adapted to secure together said optical fibres to form said cylinder.

6. A torque sensor according to claim 2, wherein said medium is formed of a plastics material having polarised strata which lie along the length of said cylinder.

7. A torque sensor according to claim 1, wherein said medium is formed of a material having a molecular structure which exhibits electromagnetic wave-guiding properties.

8. A torque sensor according to claim 3 wherein said medium is formed of a material having a refractive index which is dependent upon the torque applied to said medium, such that, in use, said portion of said wall of said cylinder is adapted to refract said emitted signal beam of electromagnetic radiation through an angle which is dependent upon the torque applied to said cylinder.

9. A torque sensor according to claim 1, comprising a substantially U-shaped housing, wherein said emitter means and said receiver means are mounted in said U-shaped housing.

10. A torque sensor according to claim 1, wherein said receiver means is optimised to detect electromagnetic radiation at a frequency of said signal beam radiation.

11. A torque sensor according to claim 1, wherein said receiver means comprises a split-faced sensor having two sensing faces of equal area.

12. A torque sensor according to claim 11, wherein each of said sensing faces is adapted to produce an output signal which is dependent upon the intensity of electromagnetic radiation incident on that sensing face and said signal processing means is adapted to process said output signals from said two sensing faces so as to produce said modified output signal which is inversely proportional to the torque applied between said input and output members of said torsion bar.

13. A torque sensor according to claim 1, wherein said receiver means comprises a sensor having a plurality of electromagnetic radiation detecting elements arranged in a grid matrix.

14. A torque sensor according to claim 13, wherein each of said detecting elements is adapted to detect the intensity of electromagnetic radiation incident on that detecting element and adapted to produce an output signal which is dependent upon said detected intensity.

15. A torque sensor according to claim 14, wherein the total sensing area of said grid matrix is sufficiently large to accommodate the cross-sectional area of said signal beam incident on said grid matrix of detecting elements when no torque is applied between said input and output members of said torsion bar and when maximum torque is applied in either direction.

16. A torque sensor according to claim 15, wherein said output signal produced by each of said detecting elements is an electronic signal and said signal processing means comprises electronic circuitry for storing data obtained by processing said output signals from said detecting elements when no torque is applied between said input and output members and when maximum torque is applied in each direction, and to process said stored data in order to determine the ratio of an applied torque in one direction to the maximum torque in that direction.

17. A torque sensor according to claim 12, wherein said electromagnetic radiation sensor is a charge coupled detector (CCD) array.

18. A torque sensor according to claim 13, wherein said electromagnetic radiation sensor is manufactured from a custom gate application specific integrated circuit (ASIC).

19. A torque sensor according to claim 1, wherein said emitter means comprises a light-emitting diode (LED).

20. A steering system for a vehicle, wherein the system includes a steering column, and said steering column incorporates a torque sensor according to claim 1.

21. A torque sensor according to claim 20, wherein the steering column comprises said torsion bar.

22. A torque sensor according to claim 21, wherein said input and output members of said torsion bar each comprise a collar of splines adapted to cut into said medium of said generally cylindrical body so as to provide a secure fit between said body and said torsion bar.

* * * * *